(12) United States Patent
Nakakita et al.

(10) Patent No.: US 6,648,023 B2
(45) Date of Patent: Nov. 18, 2003

(54) LOW PERMEABLE HOSE AND METHOD FOR PRODUCING THE SAME

(75) Inventors: Issei Nakakita, Kanagawa Prefecture (JP); Hiroaki Shibano, Kanagawa Prefecture (JP); Yuuji Kawamori, Kanagawa Prefecture (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 143 days.

(21) Appl. No.: 09/962,275

(22) Filed: Sep. 26, 2001

(65) Prior Publication Data

US 2002/0056481 A1 May 16, 2002

(30) Foreign Application Priority Data

Sep. 26, 2000  (JP) ........................................ 2000-292506

(51) Int. Cl.⁷ ................................................. F16L 11/08
(52) U.S. Cl. ...................... 138/127; 138/125; 138/126; 138/140; 138/137
(58) Field of Search .................... 138/127, 123–126, 138/137, 140, 141; 428/516, 904

(56) References Cited

U.S. PATENT DOCUMENTS

| | | | | |
|---|---|---|---|---|
| 3,614,967 A | * | 10/1971 | Royston | ..................... 138/141 |
| 4,510,974 A | * | 4/1985 | Natori et al. | ................ 138/137 |
| 5,476,121 A | * | 12/1995 | Yoshikawa et al. | ......... 138/138 |
| 5,488,975 A | * | 2/1996 | Chiles et al. | ................ 138/125 |
| 5,718,956 A | * | 2/1998 | Gladfelter et al. | ......... 428/35.9 |
| 6,074,717 A | * | 6/2000 | Little et al. | ................. 428/35.7 |
| 6,179,008 B1 | * | 1/2001 | Kawazura et al. | .......... 138/125 |
| 6,213,156 B1 | * | 4/2001 | Niki et al. | .................... 138/126 |
| 6,305,423 B1 | * | 10/2001 | De Meyer et al. | ............ 138/33 |
| 6,328,075 B1 | * | 12/2001 | Furuta et al. | ................ 138/143 |
| 6,390,140 B2 | * | 5/2002 | Niki et al. | .................... 138/127 |

FOREIGN PATENT DOCUMENTS

JP         2000146031 A    *  5/2000  ............ F16L/11/04

* cited by examiner

*Primary Examiner*—Patrick Brinson
(74) *Attorney, Agent, or Firm*—Finnegan, Henderson, Farabow, Garrett, & Dunner LLP

(57) ABSTRACT

A low permeable hose having at least a refrigerant barrier layer and a rubber layer is provided. The barrier layer is a laminate film having a structure such that resin layers sandwich a metal layer therebetween and having an elongation at breakage of 10% or more. The outermost layer of the resin layer may be an adhesive layer composed of a phenol resin based composition. The hose can be produced by heating the refrigerant barrier layer and the rubber layer to a temperature no lower than the melting point of a resin that constitutes the resin layers to melt the resin and vulcanizing said rubber layer, or, laminating an adhesive layer composed of a phenol resin based composition and the rubber layer, thereby splicing the refrigerant barrier layer and the rubber layer.

11 Claims, 1 Drawing Sheet

LOW PERMEABLE HOSE AND METHOD FOR PRODUCING THE SAME

BACKGROUND OF THE INVENTION

1. Field of the Invention

The present invention relates to a low permeable hose and to a method for producing it. More particularly, the present invention relates to a low permeable hose that has an increased resistance to the permeation of refrigerants, fuel gases, blowout gases and the like and to a method for producing such a hose.

2. Description of the Related Art

Conventional hoses generally employed as a hose for transporting a refrigerant for air conditioners of automobiles have a refrigerant barrier layer, made of a polyamide resin or a modified butyl rubber and arranged in an inner pipe thereof.

Also, to improve the low permeability of a refrigerant transporting hose, a technology using a metal vapor deposition film as the refrigerant barrier layer has been developed. For example, JP 02-209224 A discloses a low permeable rubber hose having a thin film made of a certain metal formed on an outer peripheral surface of a synthetic resin made inner pipe by a sputtering method or an ion plating method. Also, JP 02-209225 A discloses a low permeable rubber hose having a dry plated thin film of a metal or metal compound formed on an outer peripheral surface of a synthetic resin made inner pipe. However, although the formation of such a metal vapor deposition film improves the low permeability of the refrigerant barrier layer, another problem arises. That is, because it is very thin, the metal vapor deposition film cannot follow the contour of the rubber hose that is deformed to a greater extent upon use and pinholes and cracks occur in the metal vapor deposition film, from which the refrigerant leaks.

On the other hand, with a view to maintaining the low permeability to the refrigerant in spite of the deformation of the rubber hose, a rubber hose that uses a metal foil as a refrigerant barrier layer has been proposed. For example, JP 02-80881 A discloses a flon low permeable flexible hose using a laminate film composed of a metal foil and a plastic film as a barrier layer. However, the laminate film composed of a metal foil and a plastic film as disclosed in the above publication cannot maintain the low permeability to the refrigerant due to the breakage of the metal foil when the rubber hose is deformed. In addition, the above publication contains no specific teaching on the method of bonding the metal foil and the plastic film, which are considered to be materials difficult to bond to each other, and the method of bonding the nylon tube, i.e., inner tube of the hose, to the barrier layer.

Accordingly, a low permeable hose that can sufficiently endure deformation of the rubber hose and has excellent permeation resistance to refrigerants, etc. and a specific method for producing such a low permeable hose are keenly demanded.

SUMMARY OF THE INVENTION

An object of the present invention is to provide a low permeable hose that is excellent in refrigerant permeation resistance (barrier property to the refrigerant) and gas permeation resistance and has in the inside thereof a refrigerant barrier layer composed mainly of a metal layer that can follow the deformation of the hose.

Another object of the present invention is to provide method for producing a low permeable hose that is free of peeling off of the refrigerant barrier layer composed mainly of a metal layer from the hose upon use.

As a result of extensive studies, the present inventors have found out that use of a laminate film having resin films sandwiching therebetween a metal layer can improve the low permeability to refrigerants, various gases and so forth and maintain low permeability in case of deformation of the hose. Also, they have found out that when splicing such a laminate film to the rubber layer where the temperature of the refrigerant to be transported is low, heating the laminate film at a temperature no lower than the melting point of the resin contained in the resin layer that constitutes the surface of the laminate film and at the same time vulcanizing the rubber layer can give rise to firm splicing of the laminate film and rubber layer. On the other hand, in the case where the temperature of refrigerant is increased up to hundred and several tens degrees (°C.), provision of an adhesive layer made of a phenol resin composition can give a high adhesion strength such that if the temperature of the refrigerant is increased, the laminate film will not peel from the rubber layer. The present invention has been completed based on the above discoveries.

That is, according to a first aspect of the invention, the present invention provides a low permeable hose having at least a refrigerant barrier layer and a rubber layer, wherein the refrigerant barrier layer is a laminate film having a structure such that resin layers sandwich a metal layer therebetween and having an elongation at breakage of 10% or more, and preferably 30% or more.

Here, it is preferred that the metal layer is a metal foil and at least one of the resin layers has thereon a strength maintaining layer. Preferably the strength maintaining layer is a layer composed of a polyamide resin composition or a polyester resin composition.

Also, it is preferred that the strength maintaining layer is an innermost layer of the resin layer and the strength maintaining layer and the metal layer are bonded to each other with an aromatic polyester based adhesive.

Furthermore, it is preferred that an outermost layer of the resin layer is a polyolefin layer composed of a polyolefin resin composition. The polyolefin resin composition preferably contains a polyolefin resin having a melting point of 120° C. or more. Also, it is preferred that the rubber layer is constituted by a rubber composition whose vulcanization temperature is 120° C. or more.

According to a second aspect of the invention, the present invention provides a low permeable hose having at least a refrigerant barrier layer and a rubber layer, wherein the barrier layer is a laminate film having a structure such that resin layers sandwich a metal layer therebetween and having an elongation at breakage of 10% or more, and preferably 30% or more.

Here, it is preferred that the metal layer is a metal foil and at least one of the resin layers has thereon a strength maintaining layer. Preferably the strength maintaining layer is a layer composed of a polyamide resin composition or a polyester resin composition.

Also, it is preferred that the strength maintaining layer is an innermost layer of the resin layer and the strength maintaining layer and the metal layer are bonded to each other with an aromatic polyester based adhesive.

Also, it is preferred that an outermost layer of the resin layer is an adhesive layer composed of a pherol resin based composition.

According to a third aspect of the invention, the present invention provides a method for producing a low permeable hose having at least a refrigerant barrier layer and a rubber layer, comprising superimposing the refrigerant barrier layer and the rubber layer, wherein the refrigerant barrier layer is a laminate film having a structure such that resin layers sandwich a metal layer therebetween and having an elongation at breakage of 10% or more, and preferably 30% or more; and wherein the method comprises the steps of:

laminating the resin layers in the refrigerant barrier layer and the rubber layer; and heating the refrigerant barrier layer and the rubber layer to a temperature no lower than a melting point of a resin that constitutes the resin layers to melt the resin and vulcanizing the rubber layer, thereby splicing the refrigerant barrier layer and the rubber layer.

Here, it is preferred that the resin layers in the refrigerant barrier layer have a polyolefin layer composed of a polyolefin resin composition. Also, it is preferred that the refrigerant barrier layer and the rubber layer are spliced by heating them at 120° C. or more. Furthermore, it is preferred that in the refrigerant barrier layer, at least one splicing surface between the metal layer and the resin layers is coated with an aromatic polyester based adhesive before the lamination.

In a fourth embodiment, the present invention provides a method for producing a low permeable hose having at least a refrigerant barrier layer and a rubber layer, comprising superimposing the refrigerant barrier layer and the rubber layer, wherein the refrigerant barrier layer is a laminate film having a structure such that resin layers sandwich a metal layer therebetween and having an elongation at breakage of 10% or more, and preferably 30% or more, wherein the refrigerant barrier layer is a laminate film whose resin layer that constitutes a surface thereof has an adhesive layer composed of a phenol resin based composition, and wherein the method comprises the step of laminating the adhesive layer and the rubber layer, thereby splicing the refrigerant barrier layer and the rubber layer.

Here, it is preferred that in the refrigerant barrier layer, at least one splicing surface between the metal layer and the resin layers is coated with an aromatic polyester based adhesive before the lamination.

The low permeable hose of the present invention is excellent in refrigerant permeation resistance so that it can be advantageously used as a hose for transporting various refrigerants, in particular refrigerants for air conditioners of automobiles. Also, according to the method for producing a low permeable hose of the present invention, a low permeable hose that is excellent in splicing property between the rubber layer and the refrigerant barrier layer as well as in refrigerant permeation resistance can be obtained.

DETAILED DESCRIPTION OF THE INVENTION

Figure 1:
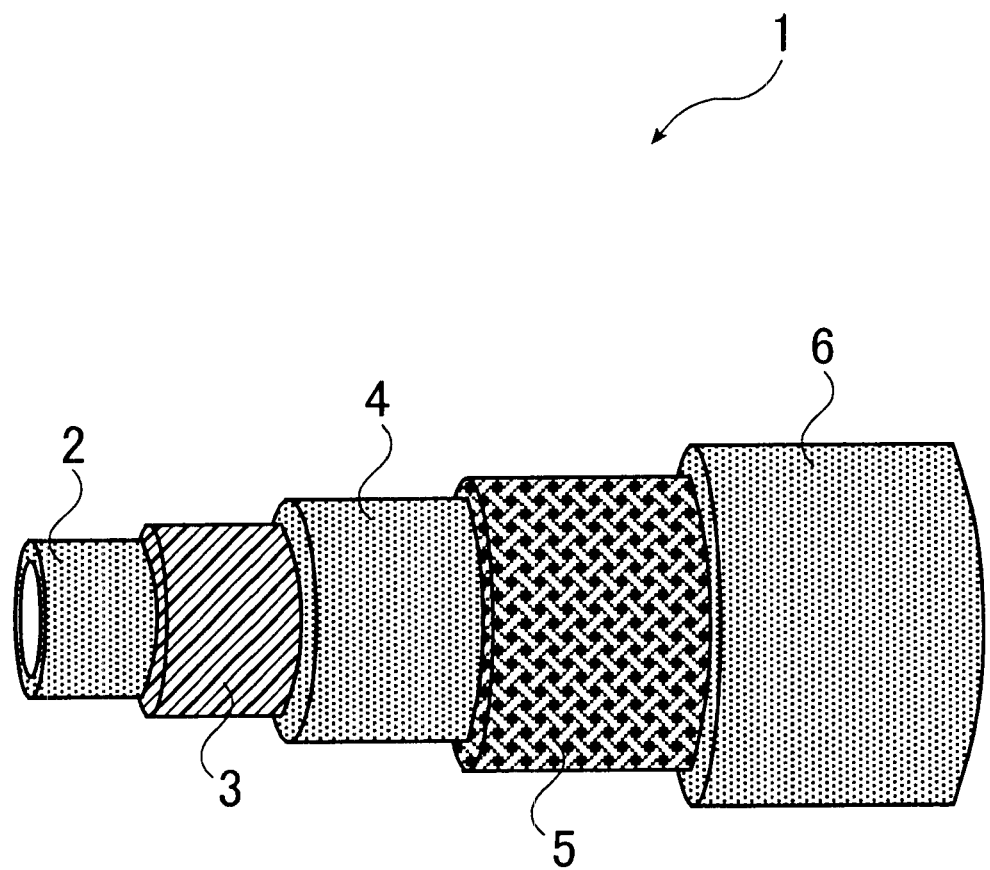
FIG. 1 is a perspective view showing an example of a low permeable hose of the present invention.

Hereinafter, the present invention will be described in detail.

The low permeable hoses according to the first and second embodiments of the present have at least a refrigerant barrier layer and a rubber layer. As the refrigerant barrier layer, use is made of a laminate film having a structure such that resin layers sandwich a metal layer therebetween and having an elongation at breakage of 10% or more.

<Refrigerant Barrier Layer>

The refrigerant barrier layer used in the low permeable hoses according to the first and second embodiments of the present invention is a laminate film composed of resin layers and a metal layer sandwiched between the resin layers.

Examples of the metal that constitutes the metal layer includes aluminum, copper, silver, gold, cobalt, iron, tin, nickel, lead, zinc and mixtures of two or more of them.

The metal layer comprises a metal foil. The thickness of the metal foil is preferably from 0.1 $\mu$m to 100 $\mu$m, more preferably from 1 $\mu$m to 30 $\mu$m from the viewpoint of refrigerant permeation resistance and a reduction in vibration transmittance.

Two resin layers that sandwich the metal layer may each be constituted by one layer or by two or more layers. The resin contained in the resin compositions constituting the two resin layers may be the same or different. The resin composition is a composition that contains a resin and optionally one or more additives.

The resin contained in the resin composition is not particularly limited and any resin may be used as far as the object of the present invention is achieved. Those resins having excellent strength at breakage and excellent elongation at breakage and those resins that can be spliced to other rubber layers or resin layers when producing a hose can be used advantageously. Mention may be made of, for example, polyamide resins, polyester resins, polyolefin resins, and polyvinyl chloride resins.

As for the resin layer, from the viewpoint of increasing the strength at breakage of the laminate film and strengthening the bond between the resin layer and the metal layer, it is preferred that at least one of the two resin layers has a strength maintaining layer that has good adhesion to the metal layer and can maintain the strength of the resin layer. The strength maintaining layer is provided preferably on an innermost layer that constitutes the surface of the resin layer assuming that in the inside of the resin layer, the direction toward the metal layer is defined inward and the direction departing from it is defined outward. In other words, the strength maintaining layer is placed adjacently the metal layer, in resin layers. By providing the strength maintaining layer, the strength at breakage, which is one of the features of the laminate film used in the present invention, can be further improved. The resin composition that constitutes the strength maintaining layer preferably contains one or more resins that are excellent in breaking strength and breaking extension. Such a resin includes, for example, polyamide resins and polyester resins. Among these are preferred those resin compositions containing polyamide resins that are particularly excellent in breaking strength and breaking extension.

In the case where a low permeable hose according to the first embodiment is to be produced as intended for applications in which the temperature of the refrigerant or refrigerator oil to be transported is 120° C. or less, it is preferred that the outermost layer of the resin layers (hereinafter, also referred to as "outermost resin layer") is a resin layer that melts upon heating and can be bonded to the rubber layer from the viewpoint of making a firm splice between the laminate films to each other and between the refrigerant barrier layer and the rubber layer to be laminated on the refrigerant barrier layer. The resin composition that constitutes such an outermost resin layer includes, for example, polyolefin rein compositions, and polyvinyl chloride resin compositions. In particular, polyolefin resin compositions are preferred. Heating the resin compositions to their melting temperature or higher to melt them enables the refrigerant barrier layer and the rubber layer to be spliced.

On the other hand, in the case where the low permeable hose of the present invention is to be used in applications in which heat resistance is particularly required such as a hose for transporting $CO_2$ refrigerant, that is, where the temperature of the refrigerant or refrigerator oil to be transported may sometimes increase to 120° C. or more, the heat fusing the resin layers as described above possibly results in a weak splice of the resin layers to the rubber layer when the resultant hose is put into a practical use.

Accordingly, the low permeable hose according to the second embodiment of the present invention comprises, as the outermost resin layer, an adhesive layer composed of a phenol resin based composition instead of the heat fusing resin layer as used in the first embodiment. The phenol resin based composition is a mixture containing a phenol based resin such as halogenated phenol resin, a phenol resin, a resorcinol resin or a cresol resin and a solvent. As the phenol based resin, halogenated phenol resin or phenol resin is preferred in view of adhesion. The solvent is not particularly limited as far as it has appropriate volatility. Preferred examples of the solvent include toluene, xylene, ketones such as methyl ethyl ketone and dimethyl ketone, and so forth. The phenol resin based composition may contain additives such as a silane-coupling agent. Addition of silane coupling agent is preferred since the splicing property between the resin layer and the rubber layer is further increased. The mixing ratio of the components is preferably from 1 to 40% by weight of the phenol based resin and from 60 to 99% by weight of the solvent based on total weight of the composition. The silane-coupling agent, if present, is contained in the range of preferably from 1 to 10% by weight.

Examples of the silane coupling agent include γ-glycidoxypropyltrimethoxysilane, γ-glycidoxypropylmethyl-dimethoxysilane, 2-(3,4-epoxycyclohexyl)ethyltrimethoxy silane, γ-mercaptopropyltrimethoxysilane, γ-isocyanato-propyltrimethoxysilane, γ-aminopropyltrimethoxysilane, γ-aminopropyltriethoxysilane, N-(β-aminoethyl)-γ-aminopropyl-trimethoxysilane and so forth. These may be used in admixture. Among them, N-(β-aminoethyl)-γ-aminopropyltrimethoxysilane is preferred.

The splicing between the metal layer and the resin layers in the first and second embodiments is preferably achieved by coating an aromatic polyester based adhesive on one or both of the splicing surfaces of the metal layer or those of the resin layers. The aromatic polyester based adhesive includes, for example, mixtures of an aromatic polyester compound such as ethyl m-aminobenzoate or methyl p-hydroxybenzoate and a solvent. The solvent is not particularly limited as far as it has appropriate volatility and preferably includes, for example, methyl ethyl ketone, ethyl acetate, and butyl acetate. It is preferred that the aromatic polyester compound is added in such an amount that the concentration in the adhesive is from 1 to 40% by weight. As the aromatic polyester based adhesive may be used commercially available preparations, for example, Vylon 300 (tradename, produced by Toyobo Co., Ltd.). They may be mixed with the solvent mentioned above so as to adjust the aromatic polyester compound to the above-described concentration.

The laminate films used in the first and second embodiments of the present invention preferably have a 4-layer structure of outermost resin layer/strength maintaining layer/metal foil/outermost resin layer, and more preferably a 5-layer structure of outermost resin layer/strength maintaining layer/metal foil/strength maintaining layer/outermost resin layer.

For example, the laminate film used where the temperature of refrigerant or HFC 134a to be transported is low, that is, used in the first embodiment, preferably includes a 4-layer structure, such as polyolefin layer/polyamide layer/metal foil/polyolefin layer, and 5-layer structures, such as polyolefin layer/polyamide layer/metal foil/polyamide layer/polyolefin layer, and polyolefin layer/polyamide layer/metal foil/polyester layer/polyolefin layer. More preferably, it includes a 4-layer structure, such as polyolefin layer/polyamide layer/aluminum foil/polyolefin layer, and 5-layer structures, such as polyolefin layer/polyamide layer/aluminum foil/polyamide layer/polyolefin layer, and polyolefin layer/polyamide layer/aluminum foil/polyester layer/polyolefin layer.

On the other hand, the laminate film where the temperature of refrigerant or HFC 134a to be transported is high, that is, used in the second embodiment, preferably includes a 4-layer structure, such as adhesive layer/polyamide layer/metal foil/adhesive layer, and 5-layer structures such as adhesive layer/polyamide layer/metal foil/polyamide layer/adhesive layer, and adhesive layer/polyamide layer/metal foil/polyester layer/adhesive layer. More preferably, it includes a 4-layer structure, such as adhesive layer/polyamide layer/aluminum foil/adhesive layer, and 5-layer structures such as adhesive layer/polyamide layer/aluminum foil/polyamide layer/adhesive layer, and adhesive layer/polyamide layer/aluminum foil/polyester layer/adhesive layer.

The polyamide resin includes, for example, nylon-46, nylon-6, nylon-66, nylon-610, nylon-611, nylon-612, nylon-11, nylon-12, nylon-666, nylon-MXD6, nylon-6T, nylon-6/66 copolymer, nylon-6/66/610 copolymer, nylon-6/6T copolymer, nylon-66/polypropylene (PP) copolymer, and nylon-66/polyphenylenesulfide (PPS) copolymer. Among these, nylon-6, nylon-66, nylon-666 and copolymers thereof are preferred. The polyamide resins may be used singly or two or more of them may be used in combination. Furthermore, they may be used in combination with other resins.

The polyester resin that can be used includes, for example, polyethylene terephthalate, polybutylene terephthalate, and polyethylene naphthalate, with polyethylene terephthalate being preferred.

The polyolefin resin preferably includes polyolefins composed of olefins having 2 to 6 carbon atoms, and more preferably polyethylene, polypropylene, polybutylene and so forth. From the viewpoints of increasing the adhesion between the laminate film and the rubber layer and of vulcanization of the rubber layer, it is preferred that polyolefins having a melting temperature of 120° C. or more are used.

The additive includes, for example, vulcanizing agents, fillers, reinforcing agents, plasticizers, antioxidants, vulcanization accelerators, softening agents, tackifiers, lubricants, dispersants, and processing aids. The additives may be selected appropriately depending on the type of the resin used in the resin layer.

As described above, the laminate film used as the refrigerant barrier layer in the first and second embodiment of the present invention is of the structure such that a resin layer is laminated on both surfaces of the metal layer so that the metal layer can elongate, following the resin layer. Therefore, the laminate film thus structured is excellent in breaking extension unlike the case where the metal layer alone is used as the refrigerant barrier layer.

That is, the laminate film used as the refrigerant barrier layer in the low permeable hose of the present invention has a breaking extension of 10% or more, and preferably 20% or more, and more preferably 30% or more. This is because the breaking extension in this range generates no crack when the hose is deformed.

The laminate film described above has a thickness of preferably from 1 μm to 500 μm and more preferably from 5 μM to 200 μm. This is because with the thickness in this range, the follow ability of the laminate film to the hose is secured while maintaining its refrigerant permeation resistance.

In the low permeable hose according to the first and second embodiments of the present invention, the laminate film used as the refrigerant barrier layer is a film of the above-mentioned structure. Such a laminate film can be formed by various methods. For example, there can be adopted a method of sandwiching a metal between resins to form a laminate and drawing it through rollers to form a film, a method of preliminarily forming thin films of resin and metal, then superimposing the films and heating them to make a single sheet of the films. Similarly, there can be used a method of dipping a metal film in a molten resin and curing the resin to form a resin layer on the surfaces of the meal film, thereby making a desired laminate film, a method of performing multilayer injection molding when forming a hose to form the barrier layer, a method of vapor depositing a desired metal on one of preliminarily formed resin films to form a metal layer and superimposing another resin on the other formed metal surface, followed by heating to thereby splice them, and so forth.

<Low Permeable Hose>

Next, the structure of the low permeable hose according to the first and second embodiments of the present invention will be described in detail below.

In the first and second embodiment of the present invention, the low permeable hose has only to take a layer structure that comprises at least a refrigerant barrier layer and a rubber layer. For example, mention may be made of a hose that comprises a refrigerant barrier layer and a rubber layer and is constituted by an inner pipe, a reinforcing layer and an outer pipe.

In this case, a single layer or a plurality of layers may constitute each pipe and the reinforcing layer. The refrigerant barrier layer may constitute a part of the inner pipe or a part of the outer pipe. Alternatively, the refrigerant barrier layer may be the inner pipe or outer pipe itself.

FIG. 1 is a perspective view showing a preferred example of a low permeable hose according to the first or second embodiment of the present invention, with each layer of the hose being partially notched. A hose 1 has an innermost layer 2, a refrigerant barrier layer 3 composed of a laminate film, and an inner pipe outer layer 4 as an inner pipe, a reinforcing layer 5 on the inner pipe outer layer 4, and further an outer pipe 6 on the reinforcing layer 5. As shown in FIG. 1, the inner pipe may take a 3-layer structure that is composed of the refrigerant barrier layer 3 sandwiched by the innermost layer 2 and the inner pipe outer layer 4. Alternatively, it may take a 2-layer structure that is composed of the innermost layer 2 and the refrigerant barrier layer 3 or a 2-layer structure that is composed of the refrigerant barrier layer 3 and the inner pipe outer layer 4. Furthermore, the outer pipe 6 may be provided with the refrigerant barrier layer 3. In this case, the outer pipe 6 may be of a multilayer structure that has the refrigerant barrier layer 3 as a part thereof.

Here, the substance that constitutes the inner pipe includes rubber compositions that comprise one or more of acrylonitrile/butadiene rubber (NBR), butyl rubber (IIR), ethylene/propylene/diene rubber (EPDM), hydrogenated NBR (HNBR), chlorosulfonated methyl polyethylene (CSM), chlorinated polyethylene (CM), brominated butyl rubber (BIIR), chlorinated butyl rubber (CIIR), halogenated isomonoolefin/p-alkylstyrene copolymer rubber (BIMS) and so forth, and thermoplastic elastomer compositions such as polyamide elastomer, polyester elastomer, polyolefin elastomer, and EPDM/PP based thermoplastic elastomer compositions. Among the thermoplastic elastomer compositions, EPDM/PP based thermoplastic elastomer compositions, which are excellent in flexibility, are preferred. More specifically, Santopren 101-73 produced by AES is used advantageously.

In the case where the refrigerant barrier layer constitutes a part of the inner pipe and where the outermost resin layer is a resin layer that can bond to the rubber layer by heating, such as a polyolefin layer (the first embodiment), it is preferred that the other layers of the inner pipe is constituted by a rubber composition or thermoplastic elastomer composition that is excellent in adhesion with the outermost resin layer that forms the surface of the refrigerant barrier layer. Preferably, such compositions contain one or more of CIIR, BIIR, BIMS, NBR, HNBR, IIR, CSM, and CM.

The vulcanization temperature of the rubber composition is preferably 120° C. or more. In the case where the outermost resin layer is a resin layer that can bond to the rubber layer by heating, such as a polyolefin layer, bonding is possible without any specific adhesive. From this point of view, the vulcanization temperature of the rubber composition is most preferably higher than the melting temperature of the resin contained in the resin layer that forms the surface of the refrigerant barrier layer.

On the other hand, in the case where the refrigerant barrier layer constitutes a part of the inner pipe and where the outermost resin layer is an adhesive layer that comprises a phenol resin based composition (the second embodiment), the other layers of the inner pipe may be the same as those descried above. In this case too, the vulcanization temperature of the rubber composition is preferably 120° C. or more.

The reinforcing layer is not particularly limited and may be formed either in a blade-like form or in a spiral-like form. The material used may include threads, wires and so forth.

The reinforcing thread may be, for examples, threads produced from vinylon filaments, rayon filaments, polyester filaments, nylon filaments, aromatic polyamide filaments or the like. The reinforcing wire includes, for example, hard steel wire, and more particularly brass-plated wire or zinc-plated wire for imparting corrosion resistance or adhesion.

The substance that constitutes the outer pipe includes rubber compositions, for example, those compositions that comprise one or more of NBR, IIR, EPDM, CR, CSM, CM and so forth, thermoplastic elastomer compositions such as polyamide elastomer, polyester elastomer, polyolefin elastomer, and EPDM/PP based thermoplastic elastomer compositions.

Furthermore, in the case where the refrigerant barrier layer constitutes a part of the outer pipe and where the outer resin layer is the heat fusing resin layer described above (the first embodiment), it is preferred that the other layers of the outer pipe is constituted by a rubber composition or thermoplastic elastomer composition that is excellent in adhesion with the resin layer that forms the surface of the refrigerant barrier layer. Preferably, such compositions contain one or more of CR, EPDM, CSM, CM, CIIR, BIIR, BIMS, and IIR.

In this case too, the vulcanization temperature of the rubber composition is preferably 120° C. or more from the viewpoint of the adhesion between the rubber layer and the laminate film. In the case where a heat fusing layer is provided as the outermost resin layer, it is most preferred that the vulcanizing temperature of the rubber composition is not lower than the melting temperature of the resin contained in the resin layer that constitutes the surface of the refrigerant barrier layer.

On the other hand, also in the case where the refrigerant barrier layer constitutes a part of the outer pipe and where the outer pipe has an adhesive layer composed of a phenol resin based composition as the outermost resin layer (the second embodiment), other layers of the outer pipe may be the same as those as exemplified above. In this case too, it is preferred that the vulcanization temperature of the rubber composition is not lower than 120° C. from the viewpoint of adhesion between the rubber layer and the laminate film.

<Method for Producing Low Permeable Hose>The method for producing a low permeable hose according to the third embodiment of the present invention is a method for producing a low permeable hose having at least a refrigerant barrier layer and a rubber layer. The refrigerant barrier layer is superimposed on the rubber layer. The refrigerant barrier layer is a laminate film having a structure such that resin layers sandwich a metal layer therebetween and having an elongation at breakage of 10% or more, and preferably 30% or more. More particularly, the resin layers in the refrigerant barrier layer and the rubber layer are laminated one on another and the refrigerant barrier layer and the rubber layer are heated to a temperature no lower than a melting point of a resin that constitutes the resin layers to melt the resin. In addition, the rubber layer is vulcanized. Thus the refrigerant barrier layer and the rubber layer are spliced.

Here, the refrigerant barrier layer of the low permeable hose may be a laminate film of such a structure that a metal layer is laminated between resin layers and it may have a breaking extension of 10% or more, and preferably 30% or more. As the laminate film, use can be made of the one exemplified as a laminate film used in the low permeable hose according to the first embodiment of the present invention, i.e., the one having a resin layer that can bond to the rubber layer by heating as the outermost resin layer of the refrigerant barrier layer.

Furthermore, as the rubber layer of the low permeable hose, use may be made of all the rubber compositions exemplified as the rubber composition that constitutes the rubber layer used in the low permeable hose according to the first embodiment of the present invention.

In the production method according to the third embodiment of the present invention, the resin layer in the refrigerant layer and the rubber layer are laminated, for example, by winding the laminate film on the rubber layer, which is the innermost layer, in a spiral form or in a vertically applied form. A rubber composition is optionally extrusion molded on the refrigerant barrier layer and a plurality of reinforcing filaments, reinforcing wires or the like are braided into a spiral or blade form to form a reinforcing layer and an outer pipe is formed thereon by extrusion molding. Subsequently, the entire hose is heated. The heating temperature is preferably 120° C. or more, and more preferably 140 to 170° C., from the viewpoint of adhesion between the refrigerant barrier layer and the other layers. By so heating, the resin in the refrigerant barrier layer is molten and the rubber composition that constitutes the rubber layer to be laminated with the resin layers is vulcanized, with the result that the refrigerant barrier layer and the adjacent rubber layer can be spliced.

On this occasion, the melting of the resin and the vulcanization of the rubber composition may be performed simultaneously or substantially simultaneously. By performing the melting of the resin and the vulcanization of the rubber layer simultaneously or substantially simultaneously, the splicing of the refrigerant barrier layer and the adjacent rubber layer has improved. Although the reason for this has not been elucidated yet, it may be considered that the molten resin particles would penetrate into the rubber layer at the time of vulcanization to physically splice the refrigerant barrier layer to the rubber layer.

Next, the production method according to the fourth embodiment of the present invention will be described.

The method for producing a low permeable hose according to the fourth embodiment of the present invention is a method for producing a low permeable hose having at least a refrigerant barrier layer and a rubber layer. The refrigerant barrier layer and the rubber layer are superimposed one on another. The refrigerant barrier layer is a laminate film having a structure such that resin layers sandwich a metal layer therebetween and having an elongation at breakage of 10% or more. Furthermore, the refrigerant barrier layer is a laminate film whose resin layer that constitutes a surface thereof has an adhesive layer composed of a phenol resin based composition. In addition, the adhesive layer and the rubber layer are laminated. Thus, the refrigerant barrier layer and the rubber layer are spliced.

Here, too, the refrigerant barrier layer of the low permeable hose may be a laminate film of such a structure that a metal layer is laminated between resin layers and it has a breaking extension of 10% or more, and preferably 30% or more. As the laminate film, use can be made of the one exemplified as a laminate film used in the low permeable hose according to the second embodiment of the present invention, i.e., the one having an adhesive layer composed of a phenol resin based composition resin as the outermost resin layer of the surface of the refrigerant barrier layer.

Furthermore, as the rubber layer of the low permeable hose, use may be made of all the rubber compositions exemplified as the rubber composition that constitutes the rubber layer used in the low permeable hose according to the second embodiment of the present invention.

In the production method according to the fourth embodiment of the present invention, the resin layer in the refrigerant layer and the rubber layer are laminated, for example, by winding the laminate film having the above-mentioned adhesive layer as the outermost layer on the rubber layer, which is the innermost layer, in a spiral form or in a vertically applied form. A rubber composition is optionally extrusion molded on the refrigerant barrier layer and a plurality of reinforcing filaments, reinforcing wires or the like are braided into a spiral or blade form to form a reinforcing layer and an outer pipe is formed thereon by extrusion molding. In the fourth embodiment of the present invention, the overlapping parts of the laminate film and the rubber layer and also of the laminate films to each other can be spliced with an adhesive layer that forms a surface of the laminate film. Subsequently, the entire hose is heated and the rubber composition that constitutes the rubber layer is vulcanized. The heating temperature is preferably 120° C. or more, and more preferably from 140 to 160° C.

As described above, the low permeable hose of the present invention is very excellent in refrigerant permeation resistance and gas permeation resistance and can supply follow the deformation. By the method for producing a low permeable hose, a low permeable hose that can be spliced well and is excellent in refrigerant permeation resistance and gas permeation resistance can be produced.

EXAMPLES

The present invention will be described in detail by examples. However, the present invention should not be construed as being limited thereto.

<Preparation of Halogenated Butyl Rubber Composition and Resin Composition>

(1) Chlorinated butyl rubber composition

Chlorinated butyl rubber composition is obtained by using the following materials in the amount as shown in Table 1.

1. Chlorinated butyl rubber: Chlorobutyl 1066, produced by Esso Chemical Co., Ltd.

2. Additives
   Carbon Black (Asahi #50, produced by Asahi Carbon Co., Ltd.)
   Stearic acid
   Antioxidant (Antage OD, produced by Kawaguchi Chemical Industry Co., Ltd.)
   Softener (Machine Oil 22, Fuji Kosan)
   Magnesia Zinc white Accelerator: Tetramethylthiuram monosulfide (TS) (Sunceller MSPO, Sanshin Chemical Industry Co., Ltd.)

TABLE 1

(Parts by weight)

|  | Chlorinated butyl rubber composition |
| --- | --- |
| Chlorinated butyl rubber | 100 |
| Carbon black | 80 |
| Stearic acid | 2 |
| Antioxidant | 2 |
| Softener | 5 |
| Magnesia | 1 |
| Zinc white | 5 |
| Accelerator TS | 2 |

(2) Polyamide reins composition

Haden N2102 (produced by Toyobo Co., Ltd.) was used as the polyamide resin composition.

(3) Polyester resin composition

Polymal (produced by Takeda Pharmaceutical Co., Ltd.) was used as the polyester composition.

(4) Polypropylene resin composition

Pyren P1128 (produced by Toyobo Co., Ltd.) was used as the polypropylene resin composition.

(5) Phenol resin based composition

A solution of 20 g of a brominated phenol formaldehyde resin (Tackirol 250-I, produced by Taoka Chemical Company, Limited) and 1 g of N-(β-aminoethyl)-γ-aminopropyltrimethoxysilane (KBM603, produced by Shin-Etsu Chemical Co., Ltd.) in 79 g of methyl ethyl ketone was used as the phenol resin based composition.

(6) Aromatic polyester based adhesive

A solution of 50 g of Vylon 300 (produced by Toyobo Co., Ltd.) in 950 g of methyl ethyl ketone was used as the aromatic polyester based adhesive.

<Preparation of Laminate Film A>

The aromatic polyester based adhesive obtained above was coated on both surfaces of a 7-μm thick aluminum foil to have a thickness of 10 μm and the polyamide resin composition obtained above was arranged thereon to have a thickness of 15 μm on each side. Furthermore, on both surfaces thereof the polypropylene resin composition obtained above was arranged to have a thickness of 20 μm on each side. Thus, a laminate film of the 5-layer structure having a breaking extension of 32% was prepared.

<Preparation of Laminate Film B>

The aromatic polyester based adhesive obtained above was coated on both surfaces of a 7-μm thick aluminum foil to have a thickness of 10 μm and the polyamide resin composition obtained above was arranged thereon to have a thickness of 15 μm on each side. Furthermore, the phenol resin based composition obtained above was arranged on each polyamide resin layer to have a thickness of 10 μm. Thus, a laminate film of the 5-layer structure having a breaking extension of 32% was prepared.

<Preparation of Laminate Film C>

A laminate film C having a breaking extension of 19% was prepared in the same manner as the laminate film B except that the polyester resin composition obtained above was used instead of the polyamide resin composition used in the laminate film B.

As for the laminate films A to C, JIS No. 1 dumbbell specimens were made and JIS K7113 tensile tests were performed thereon. The elongation until cracks occurred in the aluminum foil was visually measured to obtain breaking extension.

<Preparation of Aluminum Vapor deposition film>

An aluminum vapor deposition layer was formed on a 12-μm thick film formed from a polyamide resin composition to have a thickness of 0.6 μm to prepare an aluminum vapor deposition film. Upon measurement of the breaking extension, cracks occurred at a degree of deformation of 5%.

<Low Permeable Hose>

Example 1

The chlorinated butyl rubber composition obtained above was extruded around the periphery of a mandrel of 11 mm in diameter through a crosshead die type extruder for rubber to form a 0.8-mm thick innermost layer. A 0.2-mm thick refrigerant barrier layer was formed by winding the aluminum foil laminated film A obtained above around the innermost layer in a helical form by half wrapping. The chlorinated butyl rubber composition obtained above was extruded around the refrigerant barrier layer through a crosshead die type extruder for rubber to form a 0.8-mm thick inner pipe outer layer. A reinforcing material composed of PET filaments (1500 d, 96 filaments) was braided on the outside of the inner pipe to form a reinforcing layer. The chlorinated butyl rubber composition obtained above was extruded on the reinforcing layer through a crosshead die type extruder to form a 2-mm thick outer layer. Thereafter, this was vulcanized at 150° C. and then the mandrel was taken out to obtain a low permeable hose A of the present invention.

Example 2

The chlorinated butyl rubber composition obtained above was extruded around the periphery of a mandrel of 11 mm in diameter through a crosshead die type extruder for rubber to form a 0.8-mm thick innermost layer. A 0.154-mm thick refrigerant barrier layer was formed by winding the aluminum foil laminated film B obtained above around the innermost layer in a helical form by half wrapping. The chlorinated butyl rubber composition obtained above was extruded around the refrigerant barrier layer through a crosshead die type extruder for rubber to form a 0.8-mm thick inner pipe outer layer. A reinforcing material composed of PET filaments (1500 d, 96 filaments) was braided on the outside of the inner pipe to form a reinforcing layer. The chlorinated butyl rubber composition obtained above was extruded on the reinforcing layer through a crosshead die type extruder to form a 2-mm thick outer layer. Thereafter, this was vulcanized at 150° C. and then the mandrel was taken out to obtain a low permeable hose B of the present invention.

Comparative Example 1

A low permeable hose was prepared in the same manner as in Example 1 except that the innermost layer was formed from the polyamide resin composition and no refrigerant barrier layer was provided.

Comparative Example 2

A low permeable hose was prepared in the same manner as in Example 1 except that the aluminum vapor deposition film obtained above was wound in a spiral form by half wrapping to form the refrigerant barrier layer.

<Refrigerant Permeation Resistance Test>

Hose A before deformation and hose A after deformation, i.e., hose A after repeating 5 times 180° U-shape bending at a predetermined minimum hose bending radius (R=60 mm), followed by straightening it, were subjected to a refrigerant permeation resistance test. The refrigerant permeation resistance test was performed by adopting a method using HFC 134a as a refrigerant according to JRA 2001 of the JRA standard (Japan Refrigeration and Air-Conditioning Industry Standard).

More particularly, three out of four 50-cm long hoses were charged with 0.6 g ±0.1 g per cm³ of volume of the hose of a refrigerant (HFC 134a) under seal. The rest one hose was sealed as it was with charging no refrigerant. The four hoses were kept in an incubator at 100° C. for 96 hours and the weight of each hose was measured for every 24 hours. It was confirmed then that the inner pressure of the hose charged with the refrigerant after 96 hours was kept at a saturated vapor pressure. The amount of the refrigerant that permeated was calculated as a weight loss minus a change in weight of the hose itself from 24 hours to 96 hours by the following equation.

$$D=[(B/S1)-(C/S2)]\times 100$$

where D stands for the amount of refrigerant that permeated [g/(m/72 hr)], B stands for the weight loss of the refrigerant charged hose [g/72 hr], C stands for the weight loss of the refrigerant-non-charged hose [g/72 hr], S1 stands for the length of the refrigerant charged hose [m], and S2 stands for the length of the refrigerant-non-charged hose [m].

Table 2 shows the results obtained. In the table, Example 1's value is average of three charge hose's test result.

TABLE 2

|  | Example 1 | Comparative Example 1 | Comparative Example 2 |
|---|---|---|---|
| D (Before deformation) | 0.1 | 3.0 | 0.5 |
| D (After deformation) | 0.1 | 3.0 | 1.1 |

The above results show that the low permeable hose A of the present invention is much superior in refrigerant permeation resistance to the hose without refrigerant barrier layer (Comparative Example 1). The hose having an aluminum vapor deposition film as the refrigerant barrier layer (Comparative Example 2) had a thin vapor deposition film and a defect such as pinhole tended to occur not only when bending the hose but also when the hose is under production. On the other hand, it revealed that the low permeable hose of the present invention maintained excellent refrigerant permeation resistance as compared with the hose having an aluminum vapor deposition film as the refrigerant barrier layer both before and after the bending deformation of the hose.

<Adhesion Tests>

Next, using the low permeable hose B obtained as above, the adhesion was evaluated at room temperature, 120° C. and 150° C.

The adhesion tests were performed using a method in accordance with JIS K6330-6 and 10-mm wide rectangular specimens (type 4) were subjected to peeling tests in a prescribed temperature atmosphere using a tensile tester with an incubator.

The low permeable hose B of the present invention showed no peeling at the spliced surface between the rubber layer and the refrigerant barrier layer when heated to high temperatures.

What is claimed is:

1. A low permeable hose having at least a refrigerant barrier layer and a rubber layer, wherein the refrigerant barrier layer is a laminate film having a structure such that resin layers sandwich a metal layer therebetween and having an elongation at breakage of 10% or more.

2. A low permeable hose according to claim 1, wherein said metal layer is a metal foil and wherein at least one of the resin layers has thereon a strength maintaining layer.

3. A low permeable hose according to claim 2, wherein said strength maintaining layer is a layer composed of a polyamide resin composition or a polyester resin composition.

4. A low permeable hose according to claim 2, wherein said strength maintaining layer is an innermost layer of said resin layer and wherein said strength maintaining layer and said metal layer are bonded to each other with an aromatic polyester based adhesive.

5. A low permeable hose according to claim 1, wherein an outermost layer of said resin layer is a polyolefin layer composed of a polyolefin resin composition.

6. A low permeable hose according to claim 5, wherein said polyolefin resin composition contains a polyolefin resin having a melting point of 120° C. or more.

7. A low permeable hose according to claim 1, wherein said rubber layer is constituted by a rubber composition whose vulcanization temperature is 120° C. or more.

8. A low permeable hose having at least a refrigerant barrier layer and a rubber layer, wherein said barrier layer is a laminate film having a structure such that resin layers sandwich a metal layer therebetween and having an elongation at breakage of 10% or more and wherein an outermost layer of said resin layer is an adhesive layer composed of a phenol resin based composition.

9. A low permeable hose according to claim 8, wherein said metal layer is a metal foil and wherein at least one of the resin layers has thereon a strength maintaining layer.

10. A low permeable hose according to claim 9, wherein said strength maintaining layer is a layer composed of a polyamide resin composition or a polyester resin composition.

11. A low permeable hose according to claim 9, wherein said strength maintaining layer is an innermost layer of said resin layer and wherein said strength maintaining layer and said metal layer are bonded to each other with an aromatic polyester based adhesive.

* * * * *